US010255492B2

(12) United States Patent
Sashida et al.

(10) Patent No.: US 10,255,492 B2
(45) Date of Patent: Apr. 9, 2019

(54) IMAGE PROCESSING METHOD PROVIDING INFORMATION FOR IDENTIFYING A FUNCTION OF AN OBJECT, THE FUNCTION BEING IDENTIFIED BASED ON A POSE OF A PERSON WITH RESPECT TO THE OBJECT

(71) Applicant: KONICA MINOLTA INC., Chiyoda-ku (JP)

(72) Inventors: Takehiko Sashida, Setagaya-ku (JP); Hideki Yanagisawa, Yokohama (JP); Yoshimitsu Aoki, Yokohama (JP)

(73) Assignee: Konica Minolta, Inc., Tokyo (JP)

( * ) Notice: Subject to any disclaimer, the term of this patent is extended or adjusted under 35 U.S.C. 154(b) by 100 days.

(21) Appl. No.: 15/123,223

(22) PCT Filed: Jan. 29, 2015

(86) PCT No.: PCT/JP2015/052444
§ 371 (c)(1),
(2) Date: Sep. 1, 2016

(87) PCT Pub. No.: WO2015/133206
PCT Pub. Date: Sep. 11, 2015

(65) Prior Publication Data
US 2017/0116473 A1  Apr. 27, 2017

(30) Foreign Application Priority Data
Mar. 5, 2014 (JP) .................................. 2014-042930

(51) Int. Cl.
*G06K 9/00* (2006.01)
*G06T 7/73* (2017.01)
(Continued)

(52) U.S. Cl.
CPC ..... *G06K 9/00369* (2013.01); *G06K 9/00382* (2013.01); *G06K 9/469* (2013.01);
(Continued)

(58) Field of Classification Search
None
See application file for complete search history.

(56) References Cited

U.S. PATENT DOCUMENTS

2010/0087955 A1* 4/2010 Tsusaka ................. B25J 9/0003
700/245

FOREIGN PATENT DOCUMENTS

JP     2005-202653    7/2005
WO    WO 2012/046392  4/2012

OTHER PUBLICATIONS

Abhinav Gupta, Aniruddha Kembhavi, Larry S. Davis, "Observing Human-Object Interactions: Using Spatial and Functional Compatibility for Recognition", 2009, IEEE Transactions on Pattern Analysis and Machine Intelligence, vol. 31, pp. 1-15.*

(Continued)

*Primary Examiner* — Atiba O Fitzpatrick
(74) *Attorney, Agent, or Firm* — Cozen O'Connor

(57) ABSTRACT

Image processing apparatus programmed to: continuously shoot a subject to obtain images, and detect the object and extract a position of the object from a three-dimensional position of the subject in the images; detect the person and extract a position of the person from the three-dimensional position, and extract, from the position of the person, part information pieces including respective positions of characteristic parts of the person; generate a pose class for each set of part information pieces, the part information pieces being similar to one another in correlation between parts of the person calculated from each of the part information pieces; identify a pose class to which the correlation between parts (Continued)

of the person belongs, among generated pose classes, when a distance between the person and the object is within a predetermined range; and store the identified pose class in association with the object.

10 Claims, 15 Drawing Sheets

(51) Int. Cl.
    *G06K 9/62*     (2006.01)
    *G06K 9/46*     (2006.01)

(52) U.S. Cl.
    CPC ............ *G06K 9/622* (2013.01); *G06K 9/627* (2013.01); *G06K 9/628* (2013.01); *G06K 9/6215* (2013.01); *G06K 9/6218* (2013.01); *G06K 9/6272* (2013.01); *G06T 7/75* (2017.01); *G06T 2207/10028* (2013.01); *G06T 2207/30196* (2013.01)

(56) References Cited

OTHER PUBLICATIONS

Kiyoshi Hashimoto, "Shisei Hendo ni Tomonau Shintaiteki Tokucho Henka no Tokeiteki Modeling ni yoru Shahei ni Ganken na Jinbutsu Tsuiseki", Image Lab, vol. 24, No. 7, Japan Industrial Publishing Co., Ltd., Jul. 10, 2013, pp. 16-22.

Hideki Yanagisawa, Masaki Hayashi, Yoshimitsu Aoki, "Action Print: Estimating Usage of Human Work Space through Interaction Between Human and Object," Proceedings of Annual Conference of Electronics, Information and Systems Society (CD-ROM), I.E.E. of Japan, vol. 2012, p. ROMBUNNO. TC16-3.

\* cited by examiner

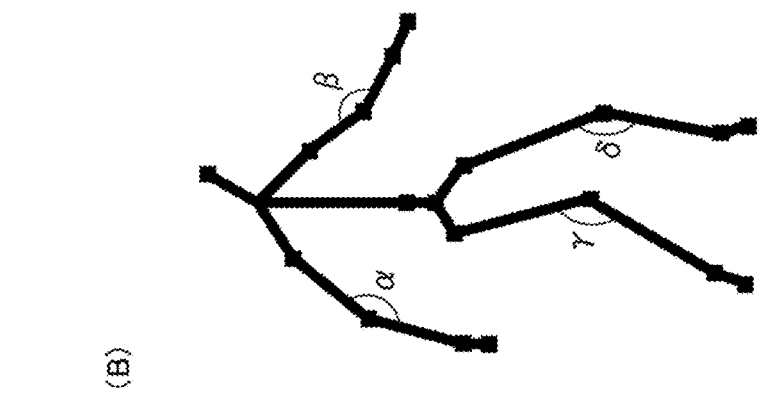
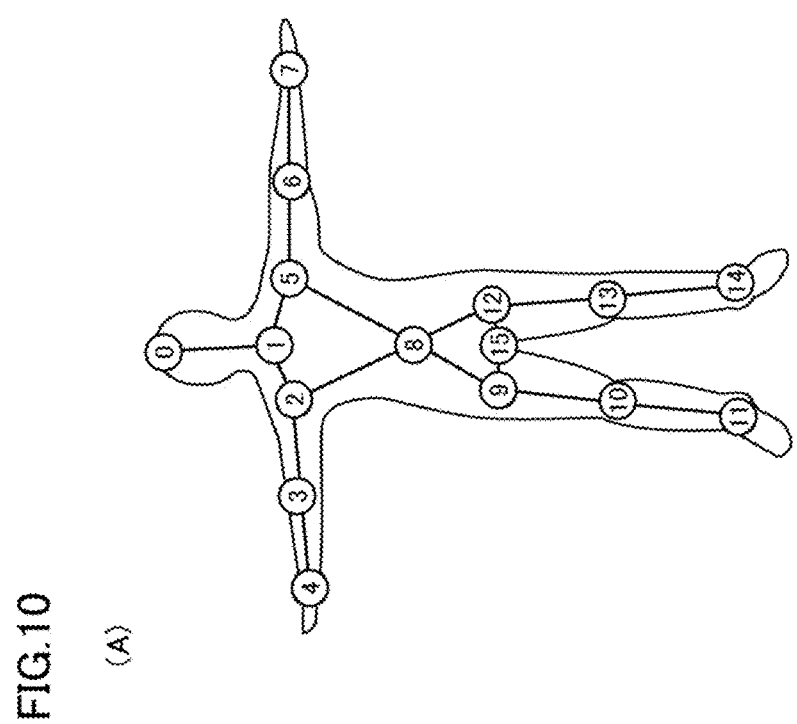
FIG.10

(INTER-PART INFORMATION)

| | | 23 |
|---|---|---|
| ANGLE | ANGLE α | 10° |
| | ANGLE β | 12° |
| | ANGLE γ | 5° |
| | ⋮ | ⋮ |
| RELATIVE DISTANCE | ①—② | $x_{1-2}$ |
| | ①—③ | $x_{1-3}$ |
| | ⋮ | ⋮ |
| | ⑭—⑮ | $x_{14-15}$ |

POSE CLASS A　　POSE CLASS B　　POSE CLASS C (POSE CLASS A)

| ANGLE | ANGLE α | 10°~20° |
|---|---|---|
| | ANGLE β | 15°~25° |
| | ANGLE γ | 0°~10° |
| | ⋮ | ⋮ |
| RELATIVE DISTANCE | ①-② | $a_{1\text{-}2} \sim b_{1\text{-}2}$ |
| | ①-③ | $a_{1\text{-}3} \sim b_{1\text{-}3}$ |
| | ⋮ | ⋮ |
| | ⑭-⑮ | $a_{14\text{-}15} \sim b_{14\text{-}15}$ |

POSE A — FUNCTION DEFINED BY POSE X AND SHORT DISTANCE FROM HEAD, TORSO, AND LEGS

POSE B — FUNCTION DEFINED BY POSE Y AND SHORT DISTANCE FROM HEAD, TORSO, AND LEGS

OBJECTS CAN BE IDENTIFIED AS HAVING DIFFERENT FUNCTIONS EVEN WHEN POSITIONAL RELATION BETWEEN OBJECT AND PERSON IS THE SAME

… (1)

IMAGE PROCESSING METHOD PROVIDING INFORMATION FOR IDENTIFYING A FUNCTION OF AN OBJECT, THE FUNCTION BEING IDENTIFIED BASED ON A POSE OF A PERSON WITH RESPECT TO THE OBJECT

RELATED APPLICATIONS

This is a U.S. National Phase Application under 35 USC 371 of International Application PCT/JP2015/052444 filed on Jan. 29, 2015.

This application claims the priority of Japanese application no. 2014-042930 filed Mar. 5, 2014, the entire content of which is hereby incorporated by reference.

TECHNICAL FIELD

The present disclosure relates to an image processing apparatus, an image processing method, and a non-transitory recording medium encoded with image processing program for providing information to identify a function of an object based on a pose of a person with respect to the object.

BACKGROUND ART

Recently, in the field of image processing, a technology for identifying a function of an object appearing in an image has been developed. Such a technology has been applied for example to the interior design and the like. Identification of a function of an object provides a clue to knowing a design and/or a shape which is easy to use by humans. In addition, such a technology has been applied to robots making environment recognition and the like. Such robots automatically learn functions of objects and as such, the robots can gain a learning ability like that of humans. There are a variety of functions of objects depending on the object type or the object shape. Even the same object may vary in a manner of use of the object depending on the environment.

In the case of chairs as an example of the object, chairs have a variety of functions depending on the type or shape of the chair. For example, chairs 101 to 106 shown in FIG. 1 have respective shapes different from one another and respective functions different from one another. Chair 101 may be used for a person to sit, while chair 105 may be used for a person to sleep. Chair 106 may be used not only for a person to sit but also as a stool to step on. Thus, there are a variety of functions of objects depending on the object type, the object shape, the environment, and the like.

The pose assumed by a person with respect to an object varies depending on the function of the object. Namely, the function of the object is closely related to the pose assumed by the person with respect to the object. Therefore, the pose of the person with respect to the object can be effective information for identifying the function of the object. As an application of this, NPD 1 discloses a technology for estimating the function of an object by identifying the pose of a person with respect to the object. According to this technology, three-dimensional information about each joint of the person is acquired. The pose of the person with respect to the object is identified, based on a piece of pose information, to which the acquired three-dimensional information belongs, among pieces of pose information registered in advance.

CITATION LIST

Non Patent Document

NPD 1: Hideki Yanagisawa, Masaki Hayashi, Yoshimitsu Aoki, "Action Print: Estimating Usage of Human Work Space through Interaction Between Human and Object," Proceedings of Annual Conference of Electronics, Information and Systems Society (CD-ROM), I.E.E. of Japan, volume: 2012, page: ROMBUNNO. TC16-3

SUMMARY OF INVENTION

Technical Problem

According to the technology disclosed in NPD 1, it is necessary for a user to define in advance the foot angle, the arm angle, and the like to be used as the pose information. Since the pose information is defined by the user from the user's subjective point of view, it is extremely difficult to accurately define the pose. Moreover, the technology disclosed in NPD 1 cannot identify an unknown pose for which the pose information has not been registered. Further, the technology disclosed in NPD 1 requires considerable labor if an enormous amount of pose information is to be registered. In this case, it is not practical to register the pose information in advance. Thus, there is a demand for a technology for automatically defining information about the pose of a person with respect to an object.

The present disclosure is made to provide a solution to the above-described problems. According to an aspect, an object is to provide an image processing apparatus capable of automatically generating and providing information for identifying a function of an object.

Solution to Problem

According to an embodiment, an image processing apparatus provides information for identifying a function of an object, the function being identified based on a pose of a person with respect to the object, the person and the object being a photography subject. The image processing apparatus includes: an object extraction unit configured to continuously shoot the photography subject to obtain a plurality of images, detect the object from a three-dimensional position of the photography subject in the images, and extract a position of the object; a person extraction unit configured to detect the person and extract a position of the person from the three-dimensional position, and extract, from the position of the person, a plurality of part information pieces including respective positions of characteristic parts of the person; a pose clustering unit configured to generate a pose class for each set of part information pieces, the part information pieces being similar to one another in correlation between parts of the person calculated from each of the plurality of part information pieces; a pose cluster identification unit configured to identify a pose class to which the correlation between parts of the person belongs, among a plurality of pose classes generated by the pose clustering unit, in a case where a distance between the person and object included in the images is within a predetermined range; and a storage unit configured to store the pose class identified by the pose cluster identification unit, in association with the object.

Preferably, the part information pieces each include at least one of a position of each joint of the person included in the images and a position of each terminal part of the person.

Preferably, the pose clustering unit is configured to generate the pose class based on that the distance between the person and the object included in the images is within a predetermined range.

Preferably, the image processing apparatus further includes a relative position identification unit configured to identify a correlation between the object and each characteristic part of the person, in a case where the distance between the person and the object included in the images is within the predetermined range. The storage unit is configured to store information representing the correlation identified by the relative position identification unit, in association with the object.

Preferably, the correlation between the object and each characteristic part of the person includes at least one of distances each between the object and each joint of the person included in the images, and distances each between the object and each terminal part of the person.

Preferably, the relative position identification unit is configured to identify a distance class to which each relative distance between the object and each part of the person belongs, among a plurality of distance classes classified in advance according to a length of distance, in a case where the distance between the person and the object included in the images is within a predetermined range. Each identified distance class is the information stored in the storage unit.

Preferably, the relative position identification unit is configured to generate a distance class for each set of similar relative distances, the relative distances are each a relative distance between the object and a position of each part of the person repeatedly extracted by the person extraction unit, and the relative position identification unit is configured to identify a distance class to which each relative distance between the object and each part of the person belongs, among a plurality of the generated distance classes, in a case where the distance between the person and the object included in the images is within a predetermined range. Each identified distance class is the information stored in the storage unit.

Preferably, the image processing apparatus further includes a function identification unit configured to identify two different objects as having respective functions different from each other, in a case where the pose class associated with one of the two different objects is different from the pose class associated with the other of the two different objects.

Preferably, the image processing apparatus further include a function identification unit configured to identify two different objects as having respective functions different from each other, in a case where the information associated with one of the two different objects is different from the information associated with the other of the two different objects.

According to another embodiment, an image processing method provides information for identifying a function of an object, the function being identified based on a pose of a person with respect to the object, the person and the object being a photography subject. The image processing method includes: continuously shooting the photography subject to obtain a plurality of images, and detecting the object and extracting a position of the object from a three-dimensional position of the photography subject in the images; detecting the person and extracting a position of the person from the three-dimensional position, and extracting, from the position of the person, a plurality of part information pieces including respective positions of characteristic parts of the person; generating a pose class for each set of part information pieces, the part information pieces being similar to one another in correlation between parts of the person calculated from each of the plurality of part information pieces; identifying a pose class to which the correlation between parts of the person belongs, among a plurality of generated pose classes, in a case where a distance between the person and the object included in the images is within a predetermined range; and storing the identified pose class in association with the object.

According to still another embodiment, a non-transitory recording medium encoded with an image processing program provides information for identifying a function of an object, the function being identified based on a pose of a person with respect to the object, the person and the object being a photography subject. The image processing program causes a computer to perform: continuously shooting the photography subject to obtain a plurality of images, and detecting the object and extracting a position of the object from a three-dimensional position of the photography subject in the images; detecting the person and extracting a position of the person from the three-dimensional position, and extracting, from the position of the person, a plurality of part information pieces including respective positions of characteristic parts of the person; generating a pose class for each set of part information pieces, the part information pieces being similar to one another in correlation between parts of the person calculated from each of the plurality of part information pieces; identifying a pose class to which the correlation between parts of the person belongs, among a plurality of generated pose classes, in a case where a distance between the person and the object included in the images is within a predetermined range; and storing the identified pose class in association with the object.

Advantageous Effects of Invention

In accordance with the present invention, information for identifying a function of an object can automatically be generated and provided.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 10 is a diagram schematically showing characteristic parts of a person.

DESCRIPTION OF EMBODIMENTS

Figure 1:
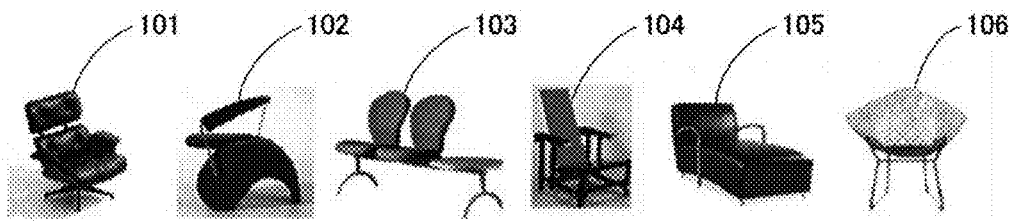
FIG. 1 is a diagram showing respective outward appearances of chairs having respective functions different from one another.

Embodiments will be described hereinafter with reference to the drawings. In the following description, the same parts or components are denoted by the same reference characters. They are named identically and function identically. Therefore, a detailed description of them will not be herein repeated. It should be noted that embodiments and/or modifications described below may selectively be combined.

<Related Art>

Figure 2:
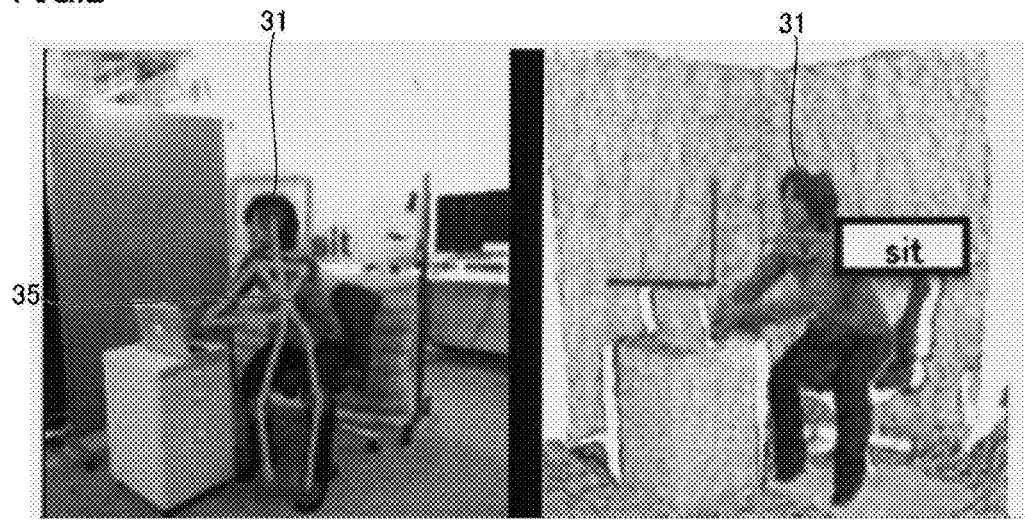
FIG. 2 is a diagram showing an example of a manner of displaying a distance image to which a function label is added.
Figure 3:
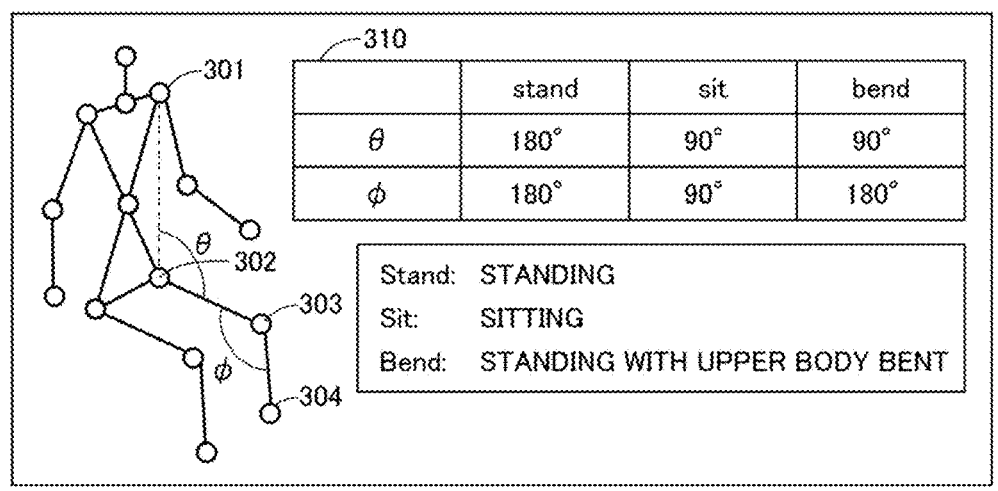
FIG. 3 is a diagram showing a human model and pose information obtained from a three-dimensional position of a photography subject.

First, for the sake of deepening understanding of embodiments of the present invention, a description will be given of an image processing apparatus of the related art relevant to the present application, with reference to FIGS. 2 and 3. FIG. 2 is a diagram showing an example of a manner of displaying a distance image to which a function label is added. FIG. 3 is a diagram showing a human model and pose information obtained from a three-dimensional position of a photography subject.

The image processing apparatus of the related art is capable of automatically adding a label for identifying a pose with respect to an object, or a label for identifying a function of an object, based on pose information registered in advance. More specifically, the image processing apparatus extracts the position of a characteristic part of a person (hereinafter also referred to as "part information") from a three-dimensional position of a photography subject obtained by shooting the subject. The image processing apparatus identifies the pose of the person, based on to which pose information the extracted part information belongs, among pieces of pose information 310 registered in advance.

As shown in FIG. 3, the pose information is expressed for example by a positional relation between respective positions of characteristic parts of a person. By way of example, a standing pose "stand" is defined by an angle $\theta$ of 180° and an angle $\phi$ of 180°, where angle $\theta$ is defined by a left shoulder position 301, a left hip position 302 and a left knee position 303, and angle $\phi$ is defined by left hip position 302, left knee position 303, and a left foot position 304.

The image processing apparatus of the related art calculates a similarity between the part information at the time the person touches an object, and each of poses ("stand," "sit," and "bend") registered as pre-registered pose information 310, and adds a pose with a high similarity to the object. The pose is added in the form of a label. For example, when a person 31 touches a chair 32 and assumes a pose with the hip bent by 90 degrees and the legs bent by 90 degrees, a "sit" label is added to chair 32.

In this way, the image processing apparatus of the related art can identify the function of the object based on the human pose. Such an image processing apparatus is applicable to the interior design and the like. For example, the pose information with respect to an object is used for determining a design and/or a shape which is easy to use by humans. In addition, the image processing apparatus is also applied to environment recognition and the like. The environment recognition is applied to the robotics and the like. Robots automatically learn functions of objects and as such, the robots can gain a learning ability like that of humans.

<First Embodiment>

[General Description]

Figure 4:
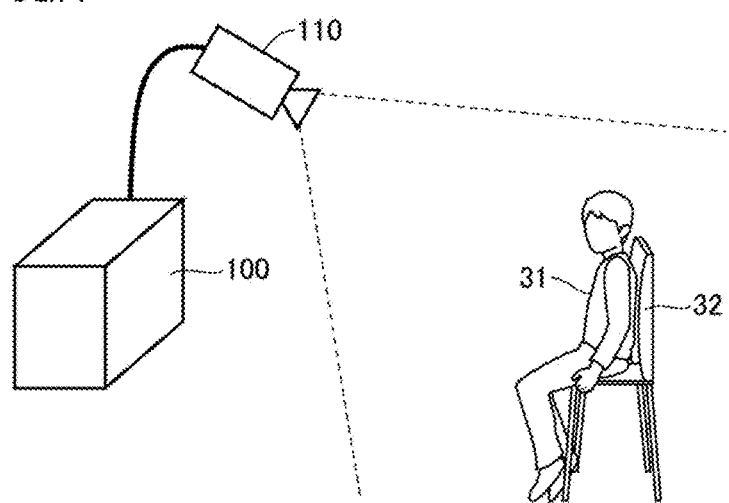
FIG. 4 is a diagram showing a state where a camera connected to an image processing apparatus in a first embodiment shoots a photography subject.
Figure 5:
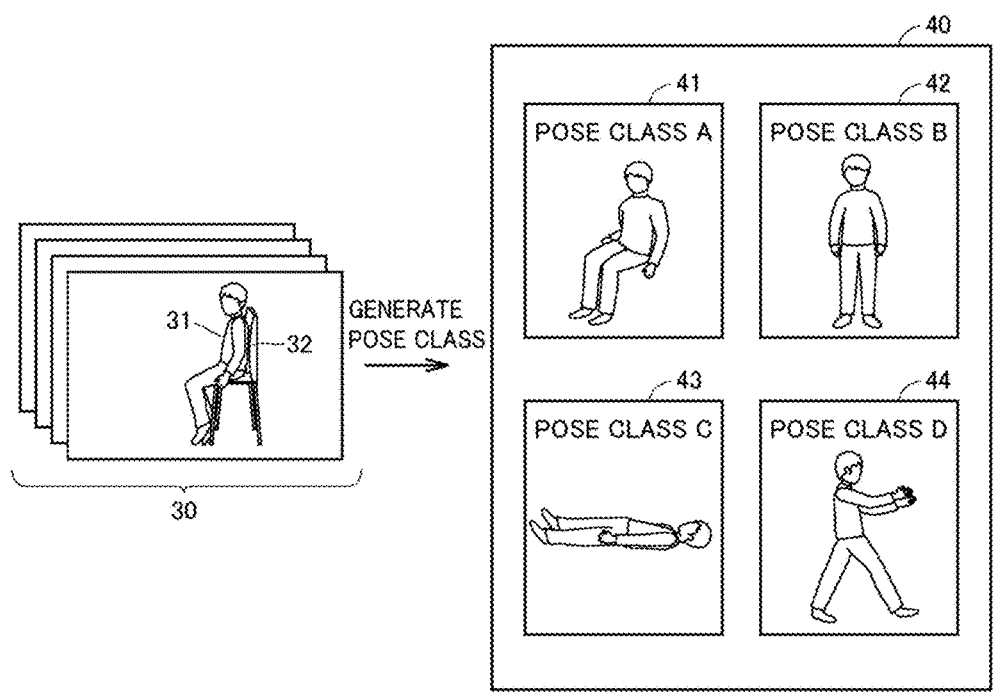
FIG. 5 is a diagram generally showing clustering by the image processing apparatus in the first embodiment.
Figure 6:
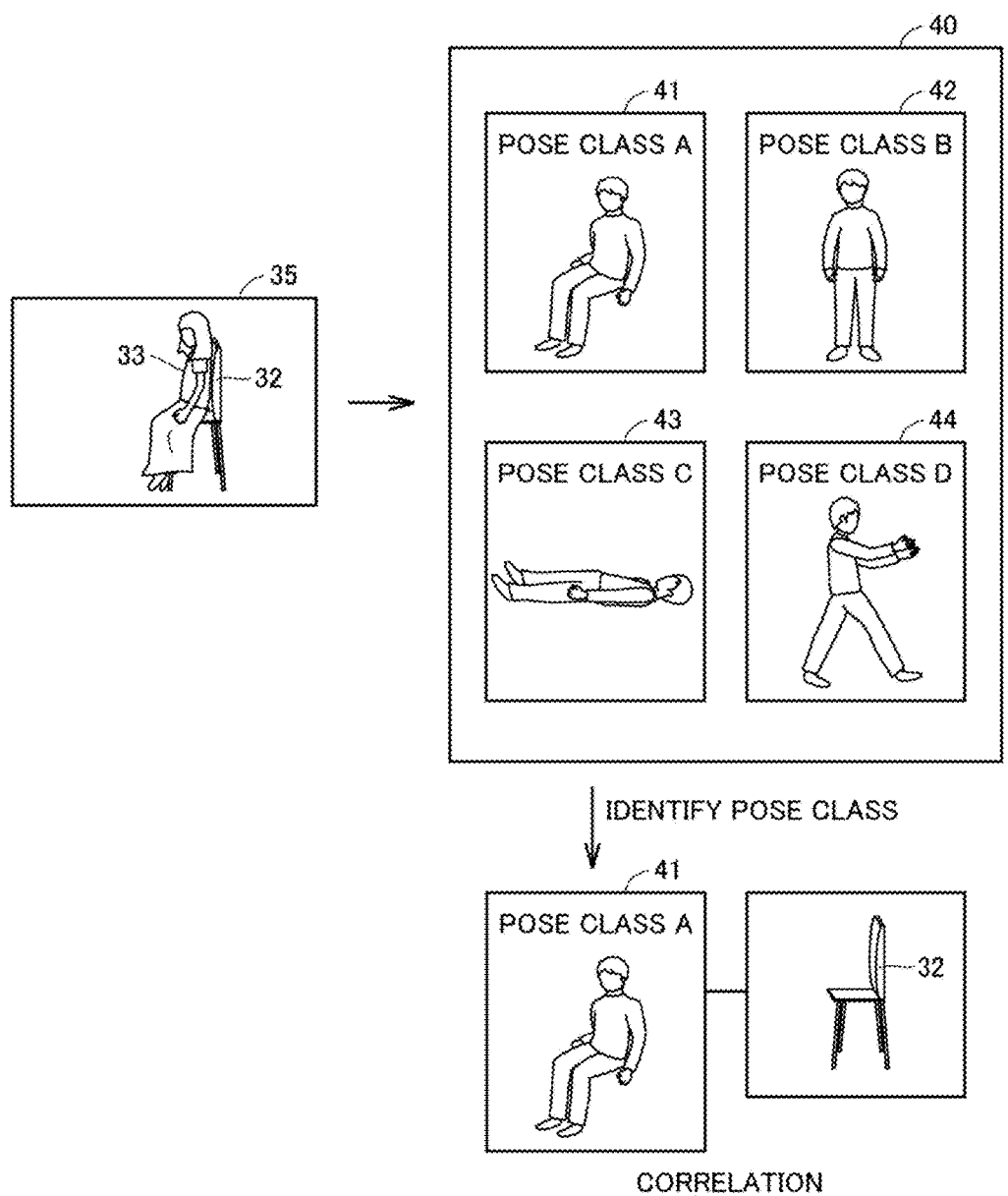
FIG. 6 is a diagram generally showing a process of identifying a pose class with respect to an object.

Referring to FIGS. 4 to 6, a general description will be given of an image processing apparatus 100 in a first embodiment. FIG. 4 is a diagram showing a state where a camera 110 connected to image processing apparatus 100 continuously shoots a photography subject (including both a person and an object described later herein). FIG. 5 is a diagram generally showing clustering by image processing apparatus 100. FIG. 6 is a diagram generally showing a process of identifying a pose class with respect to an object.

The image processing apparatus of the related art as described above is required to register the pose information in advance. Since the pose information is defined by a user from the user's subjective point of view, it is extremely difficult to accurately define the pose. In order to absorb an error of the pose defined by the user, the value defined by pose information 310 shown in FIG. 2 may have an allowance. However, it is still considerably difficult to uniquely determine the allowance of the value. Image processing apparatus 100 in the present embodiment is not required to register the pose information in advance and is capable of automatically generating pose classes for classifying human poses, based on collected part information.

In the following, image processing performed by image processing apparatus 100 will generally be described. As shown in FIG. 4, camera 110 is connected to image processing apparatus 100. A field of view of camera 110 includes a person 31 and a chair 32. Image processing apparatus 100 obtains a three-dimensional position of the photography subject included in the field of view of camera 110. The three-dimensional position is obtained for example from a distance image indicating the distance from camera 110 to each point on the subject. In the following, the term "three-dimensional position" used herein encompasses the concept of "distance image" and the term "distance image" used herein encompasses the concept of "three-dimensional position."

In order to shoot various poses of the person, camera 110 continuously shoots person 31 to thereby obtain a plurality of distance images. Accordingly, as shown in FIG. 5, image processing apparatus 100 can collect distance images showing various poses of the person. Image processing apparatus 100 detects the person from distance image 30 obtained by camera 110 and also successively extracts the position of the person from distance image 30. Moreover, image processing apparatus 100 successively extracts part information including the position of each characteristic part of the person, from the extracted position of the person. The part information includes at least one of the position of each joint of the person included in the field of view of camera 110, and the position of each terminal part of the person.

Based on the extracted part information, image processing apparatus 100 calculates a correlation between characteristic parts of the person (hereinafter also referred to as "inter-part relation"). Image processing apparatus 100 generates a pose class for each set of part information pieces which are similar to one another in terms of the inter-part relation. In this way, image processing apparatus 100 can automatically classify poses assumed by the person during shooting, into groups each constituted of similar poses.

For example, in the case where the shot person assumes a sitting pose, a pose class 41 representing the sitting pose is generated. In the case where the shot person assumes a walking pose, a pose class 42 representing the walking pose is generated. In the case where the shot person assumes a lying pose, a pose class 43 representing the lying pose is generated. In the case where the shot person assumes a pose of holding an object, a pose class 43 representing a holding pose is generated.

Next, as shown in FIG. 6, image processing apparatus 100 identifies the pose assumed by the person with respect to the object when the person touches the object or the person is in close proximity with the object. More specifically, when the distance from the position of the person extracted from the distance image to the position of the object (chair 32 for example) extracted from the distance image is within a predetermined range, image processing apparatus 100 identifies a pose class to which the correlation between the parts of the person belongs, among generated pose classes 41 to 44.

In this way, image processing apparatus 100 automatically classifies poses into groups each constituted of similar poses. Therefore, it is unnecessary to register the pose information in advance, and the labor required for registering the pose information is saved. Moreover, since the pose classes are automatically generated, image processing apparatus 100 can correctly identify the pose with respect to the object.

[Hardware Configuration]

Figure 7:
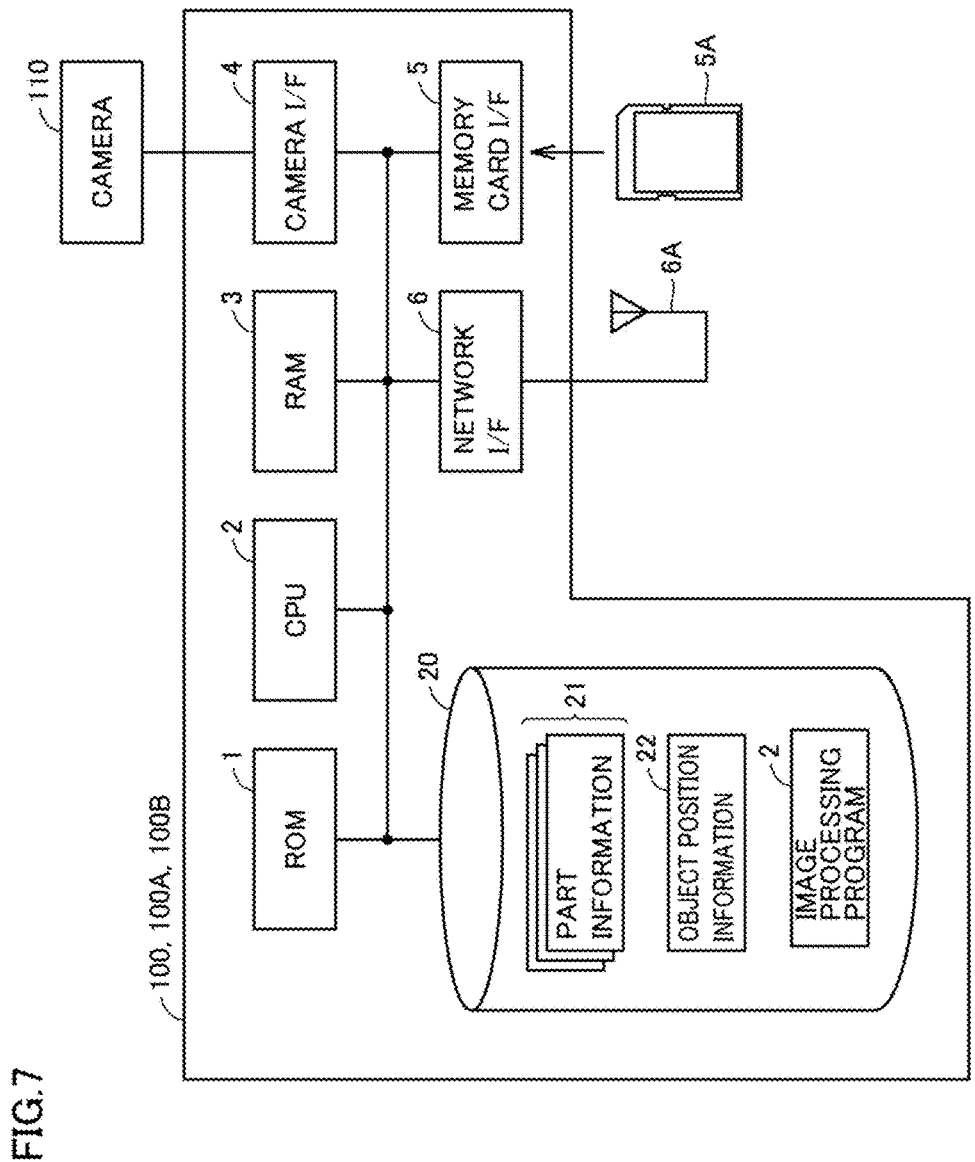
FIG. 7 is a block diagram showing an example of a hardware configuration of the image processing apparatus in the first embodiment.

FIG. 7 is a block diagram showing an example of a hardware configuration of image processing apparatus 100. With reference to FIG. 7, the hardware configuration of image processing apparatus 100 will be described.

Referring to FIG. 7, image processing apparatus 100 is mostly implemented on a computer having a general-purpose architecture. Image processing apparatus 100 includes, as main components, a ROM (Read Only Memory) 1, a CPU (Central Processing Unit) 2, a RAM (Random Access Memory) 3, a camera interface (I/F) 4, a memory card interface (I/F) 5, a network interface (I/F) 6, and a storage device 20.

ROM 1 stores an initial program (boot program) or the like executed in image processing apparatus 100 upon startup. CPU 2 controls the whole image processing apparatus 100 by executing various kinds of programs such as an operating system (OS) and an image processing program 24 stored in ROM 1, storage device 20, and the like. RAM 3 functions as a working memory for CPU 2 to execute a program, and temporarily stores any of various kinds of data necessary for execution of the program.

Camera I/F 4 serves as an interface for data communication between CPU 2 and camera 110. For example, camera I/F 4 includes an image buffer and temporarily stores distance images transmitted from camera 110. Upon storing data of at least one input image, camera I/F 4 transfers the stored data to storage device 20 or ROM 1. Moreover, camera I/F 4 instructs camera 110 to shoot, in accordance with an internal command generated by CPU 2. Camera 110 includes for example stereo camera, distance image sensor detecting three-dimensional positional information about a photography subject, and other cameras capable of acquiring the three-dimensional position of a photography subject. Camera 110 may be incorporated in image processing apparatus 100. In this case, camera I/F 4 is not a requisite component.

Memory card I/F 5 is used for writing data to or reading data from any of various kinds of memory cards (nonvolatile storage medium) 5A such as SD (Secure Digital) card and CF (Compact Flash (registered trademark)) card. Typically, a memory card 5A in which distance images obtained by another device are stored is set in memory card I/F 5, and distance images read from memory card 5A are stored in storage device 20.

Network I/F 6 communicates data with other devices (such as server device) via any of various kinds of communication media. More specifically, network I/F 6 performs data communication via a wired network like Ethernet (registered trademark) (such as LAN (Local Area Network), WAN (Wide Area Network), and the like), and/or a wireless network such as wireless LAN.

Storage device 20 typically includes a magnetic mass storage medium such as hard disk. Storage device 20 stores image processing program 24 for implementing various functions in the present embodiment, part information 21 including the extracted position of each characteristic part of the person, and object position information 22 representing the position of the object on the distance image. Further, in storage device 20, a program such as operating system may be stored. Details of part information 21 will be given later herein.

Camera 110 may be incorporated in image processing apparatus 100, rather than externally attached to image processing apparatus 100, and image processing apparatus 100 may itself have a function of shooting the subject. Image processing apparatus 100 may be configured to obtain the distance image using a mechanism similar to the camera, and the obtained distance image may be input to image processing apparatus 100 by any method. In this case, the distance image is input to image processing apparatus 100 through memory card I/F 5 or network I/F 6.

Image processing program 24 stored in storage device 20 is distributed in the form of a storage medium such as CD-ROM (Compact Disk-Read Only Memory) on which the image processing program is stored, or image processing program 24 is delivered from a server device or the like via a network. Image processing program 24 may be implemented by modules. Specifically, from program modules provided as a part of the operating system executed by image processing apparatus 100, necessary modules may be called and executed at a predetermined timing and in a predetermined order so as to perform processing. In this case, image processing program 24 itself does not include the modules provided by the operating system, and image processing is implemented through cooperation between image processing program 24 and the operating system.

Moreover, image processing program 24 may not be a standalone program but incorporated in a part of a given program and provided as a part of the given program. In this case as well, modules commonly used by the given program are not included in image processing program 24 itself, and image processing is implemented through cooperation between image processing program 24 and the given program. Such image processing program 24 without including some modules as described above still does not go beyond the concept of image processing apparatus 100 in the present embodiment. Further, a part or the whole of functions provided by image processing program 24 may be implemented by dedicated hardware.

Further, image processing apparatus 100 may not necessarily perform processing in real time. For example, image processing apparatus 100 may be configured to operate in the form of the so-called cloud service where at least one server device implement the processing in the present embodiment. In this case, the distance image is transmitted to the server device (the cloud) and the server device performs the image processing in the present embodiment on the received distance image. Further, it is not necessary for the server device to perform all functions (processing), and the image processing in the present embodiment may be implemented through cooperation between a user terminal and the server device.

[Functional Configuration]

Figure 8:
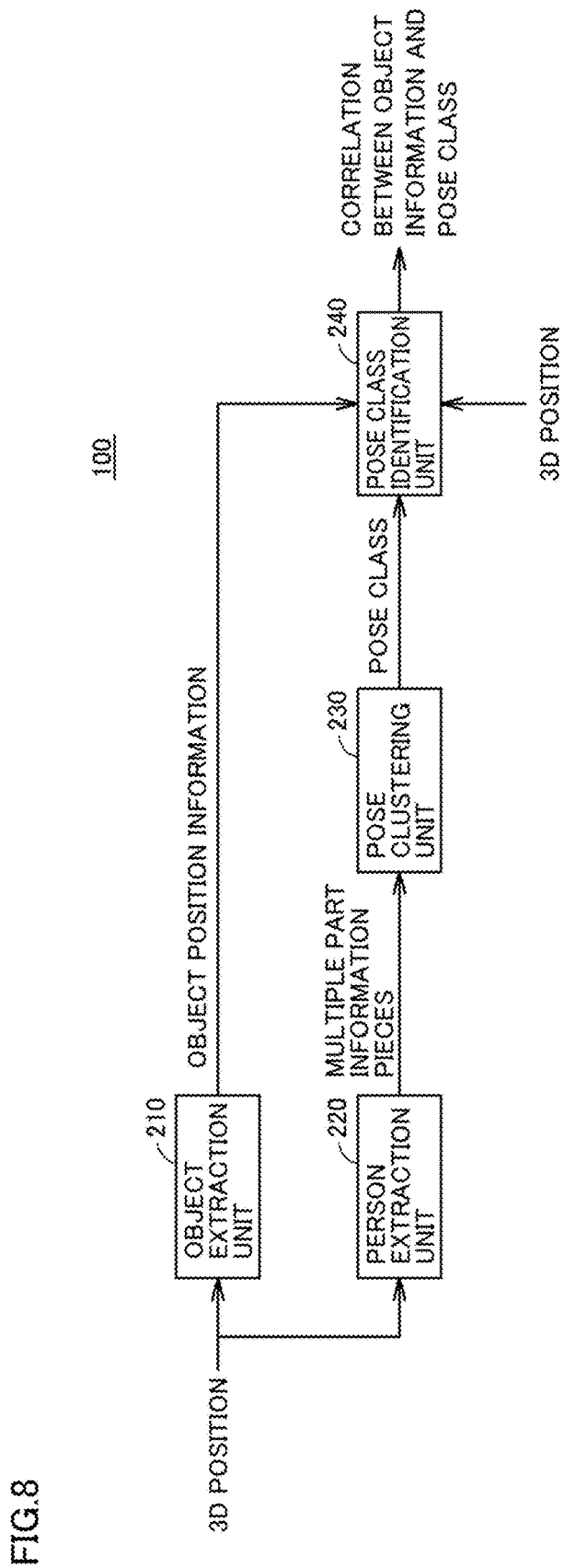
FIG. 8 is a block diagram showing an example of a functional configuration of the image processing apparatus in the first embodiment.

FIG. 8 is a block diagram showing an example of a functional configuration of image processing apparatus 100 in the first embodiment. Referring to FIG. 8, the functional configuration of image processing apparatus 100 will be described.

Image processing apparatus 100 includes an object extraction unit 210, a person extraction unit 220, a pose clustering unit 230, and a pose class identification unit 240.

Object extraction unit 210 continuously shoots a photography subject to obtain a plurality of three-dimensional positions (namely distance images), detects an object and extracts the position of the object, from the three-dimensional positions. Object extraction unit 210 outputs the extracted three-dimensional position of the object to pose class identification unit 240. Details of object extraction unit 210 will be described later herein.

Person extraction unit 220 detects a person and extracts the position of the person, from the three-dimensional positions (namely distance images), and extracts a plurality of part information pieces from the position of the person. The part information pieces include respective positions of characteristic parts of the person. Person extraction unit 220 outputs the extracted three-dimensional position of the person to pose clustering unit 230. Details of person extraction unit 220 will be described later herein.

Pose clustering unit 230 generates a pose class for each set of part information pieces similar to one another in terms of the correlation between parts of the person calculated from part information 21. Namely, pose clustering unit 230 classifies the part information pieces into groups each including similar poses. Pose clustering unit 230 outputs the generated pose class to pose class identification unit 240. Details of pose clustering unit 230 will be described later herein.

Pose class identification unit 240 identifies one of a plurality of generated pose classes, namely the pose class to which the correlation between parts of the person belongs, in the case where the distance between the person and the object included in the three-dimensional position (namely the distance image) is within a predetermined range. Typically, the operation of pose class identification unit 240 is performed when the person touches or is in close proximity with the object. Details of pose class identification unit 240 will be described later herein. Pose class identification unit 240 stores, in storage device 20, the object touching or in close proximity with the person, in association with the identified pose class.

[Details of Object Extraction Unit 210]

Figure 9:
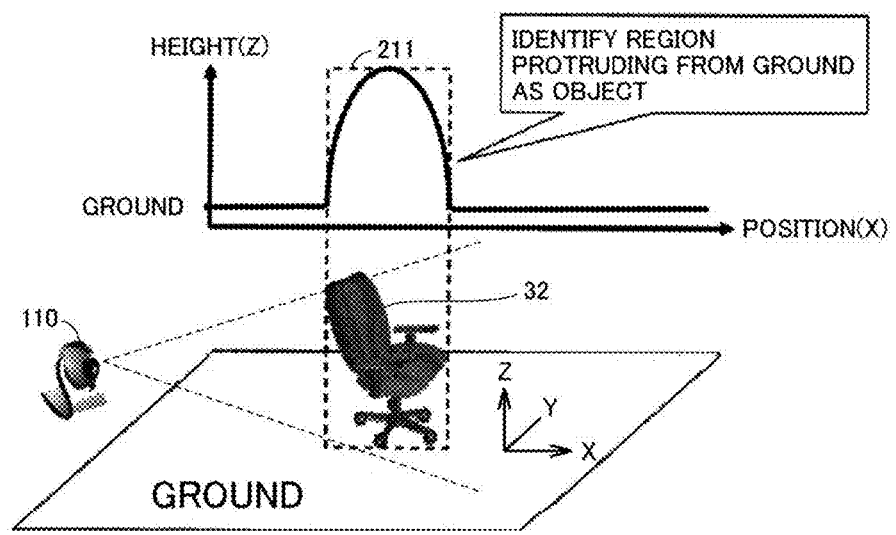
FIG. 9 is a diagram showing a state where a camera shoots a chair.

Referring to FIG. 9, details of object extraction unit 210 will be described. FIG. 9 is a diagram showing a state where camera 110 shoots a chair 32.

Object extraction unit 210 extracts the position of the object, from the three-dimensional position obtained from camera 110 such as distance image sensor. In the example shown in FIG. 9, object extraction unit 210 estimates the ground from the three dimensional position and extracts, as the object, a region located higher than the ground. Namely, as shown in FIG. 9, object extraction unit 210 identifies the position corresponding to a region 211 as the position of the object. While "position" of the object in the example of FIG. 9 is expressed as a one-dimensional position (x-axis) for the sake of simplifying the description, "position" is actually a two-dimensional position (x axis, y axis). Therefore, the position of the object is expressed as a two-dimensional position (x axis, y axis). The position of the object may be expressed as a three-dimensional position (x axis, y axis, z axis).

Alternatively, object extraction unit 210 may identify the position of the object by the so-called background subtraction, namely subtracting a background image obtained by shooting when no person is present, from the obtained distance image. In this case, object extraction unit 210 identifies, as the position of the object, a region which is changed as compared with the background image at the time of being shot (initial state). Since the position of the person is identified by person extraction unit 220, object extraction unit 210 can exclude the position of the person from the identified object. Moreover, object extraction unit 210 may identify the ground itself as one object.

[Details of Person Extraction Unit 220]

Figures 11, 12:
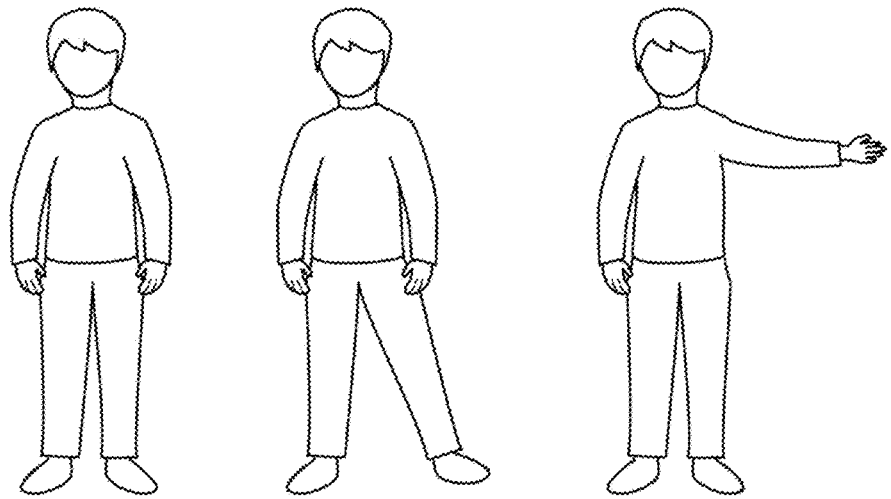
FIG. 11 is a diagram showing a data structure of a correlation (namely inter-part relation) between parts calculated from part information.
FIG. 12 is a diagram visually illustrating classified pose classes.

Referring to FIGS. 10 and 11, details of person extraction unit 220 will be described. FIG. 10 is a diagram schematically showing characteristic parts of a person. FIG. 11 is a diagram showing a data structure of the correlation (namely inter-part relation) between parts calculated from the part information.

Person extraction unit 220 detects the person and recognizes the pose of the person, based on the three-dimensional information obtained from camera 110 such as distance image sensor. The pose is herein defined by information about relative locations of body parts, namely where the characteristic parts such as joints of the person and a terminal part like the head of the person are located relative to each other.

Person extraction unit 220 uses for example a Kinect (registered trademark) sensor of Microsoft (registered trademark) as camera 110 to obtain skeleton information representing the three-dimensional position of each part of the person. By means of the Kinect sensor, characteristic parts (hereinafter also referred to as "nodes") such as joints of the person can be detected and the relative locations of the nodes can also be detected. The Kinect sensor can be used to obtain, for example, the three-dimensional positions of human nodes (1) to (15) as shown in FIG. 10.

Person extraction unit 220 identifies, based on the three-dimensional positions of nodes (1) to (15) obtained by the Kinect sensor, the correlation between nodes (namely inter-part relation). The inter-part relation includes the distance between any two nodes among the nodes, the angle defined by any three nodes among the nodes, and the like. For example, as shown in FIG. 10, the inter-part relation includes an arm angle α, an arm angle β, a leg angle γ, a leg angle δ, and the like.

Person extraction unit 220 successively stores, in storage device 20, the inter-part relations calculated based on part information 21 extracted from the repeatedly obtained distance images. FIG. 11 shows a data structure of an inter-part relation 23 calculated from one of pieces of part information having been obtained successively. Inter-part relation 23 includes the distance between any two nodes among the nodes, the angle defined by any three nodes among the nodes, and the like, as described above. Inter-part relation 23 may also include the three-dimensional position of each node, a correlation between any four or more nodes among the nodes, and the like. The number of nodes for defining the correlation can be increased to more accurately define the pose.

While the above description is given regarding the example where the Kinect sensor is used to detect a person and recognize the pose of the person, means for detecting a person and means for recognizing the pose of the person are not limited to them. For example, person extraction unit 220 may use a template of the person or a template of each part of the person registered in advance, and perform template matching for the distance image to thereby extract the position of the person and the position of each part. Besides, any method may be used as long as the method can be used to identify the position of a person and the position of each part of the person.

Moreover, the extraction of the position of the person and the extraction of the inter-part relation may be performed only in the case where the person touches the object or the person is in close proximity with the object. More specifically, in response to the fact that the distance between the person and the object becomes within a predetermined range, person extraction unit 220 performs the extraction of the position of the person and the extraction of the inter-part relation. The state where the person touches the object is considered as a state where the object performs a certain function for the person. Therefore, the touch of the person with the object can be used as a trigger to exclude information about the pose of the person having no action on the object, and efficiently detect the person's pose with respect to the object.

For example, in the case where the distance between the person and the object is a predetermined threshold value or less, it is determined that the person touches the object. Regarding which part of the person and which part of the object should be used for determining whether they touch each other based on the distance between these parts, the shortest distance between the person and the object may be used. The distance between the object and "hand" which is regarded as most significant for determining the interaction between the person and the object may be used, or the distance between the position of the gravity center of the person and the position of the gravity center of the object may be used. Besides, as means for determining whether the person touches the object, any method may be used as long as the method can be used to detect the touch between the person and the object.

[Details of Pose Clustering Unit 230]

Figure 13:
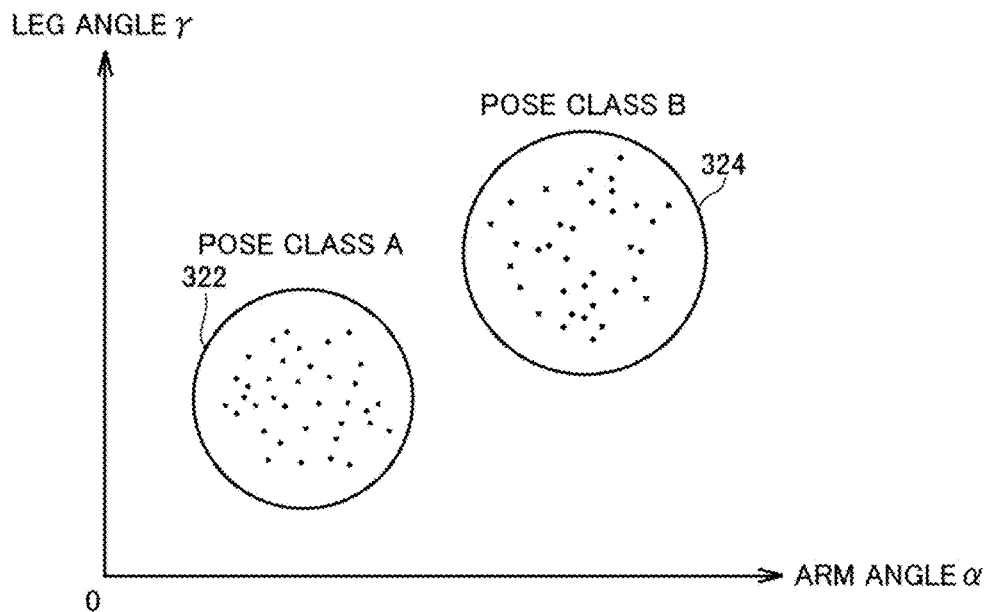
FIG. 13 is a diagram showing a distribution of the inter-part relation.

Referring to FIGS. 12 and 13, details of pose clustering unit 230 will be described. FIG. 12 is a diagram visually illustrating classified pose classes. FIG. 13 is a diagram showing a distribution of the inter-part relation.

Pose clustering unit 230 clusters similar poses based on the results of observation in the past. The pose information of the person may directly be used to identify the pose of the person without clustering poses. However, in this case, the poses could be classified excessively finely. For example, although "pose A," "pose B," and "pose C" as shown in FIG. 12 are the same poses in that they are all standing poses, these poses could be classified into different poses due to slight differences, such as opened legs like "pose B" or raised arm like "pose C." If the poses are thus classified excessively finely, labels to be added to the object are also too finely defined. Therefore, pose clustering unit 230 generates one pose class for each set of similar inter-part relations, in order to recognize similar poses as a single pose.

FIG. 13 shows a distribution using, as indices, arm angle α (see FIG. 10 (B)) and leg angle γ (see FIG. 10 (B)) which are each an example of the inter-part relation. Each point in the distribution represents the inter-part relation extracted from the distance image obtained repeatedly. While FIG. 13 shows the distribution of the inter-part relation on a two-dimensional graph for the sake of simplifying the description, actually the distribution has the number of dimensions corresponding to the kinds of indices used for representing the relation between nodes defined for the inter-part relation. As shown in FIG. 13, pose clustering unit 230 groups for example a set of points where arm angle α and leg angle γ are close to each other to generate a pose class A and a pose class B.

It should be noted that pose clustering unit 230 may perform clustering only in the case where the person touches the object. Namely, based on that the distance between the person and the object is within a predetermined range, pose clustering unit 230 generates pose classes. In this way, the pose of the person having no action on the object can be extruded and the clustering can efficiently be performed.

Moreover, the clustering technique is not particularly limited, and may be any technique as long as the technique can be used to cluster similar poses of the person. For example, the clustering technique includes a hierarchical technique and a non-hierarchical technique. The hierarchical technique may for example be a technique of successively connecting two spatial points with a short distance therebetween as indicated by the index of the inter-part relation, until the distance exceeds a predetermined value. Pose clustering unit 230 stops connecting the points when the distance exceeds a predetermined value, and a set of the connected points is defined as one pose class. This technique is based on the fact that there is a certain difference in distribution position between pose classes, namely there would be a certain distance between pose classes. Since the above-described process is stopped when the distance is smaller than a predetermined value, the pose class will not be limitlessly increased. Moreover, the non-hierarchical clustering technique may be k-means method, or the like.

Pose clustering unit 230 can cluster similar poses to group poses having similar characteristics so that these poses belong to the same pose class. Moreover, any slight difference between poses and any element which is not important for the pose to be assumed such as the position of the hand when the "sitting" pose is assumed may be excluded. Further, clustering can be performed to appropriately learn the poses to adapt the function to any poses other than the poses prepared in advance by a user.

[Details of Pose Class Identification Unit 240]

Figure 14:
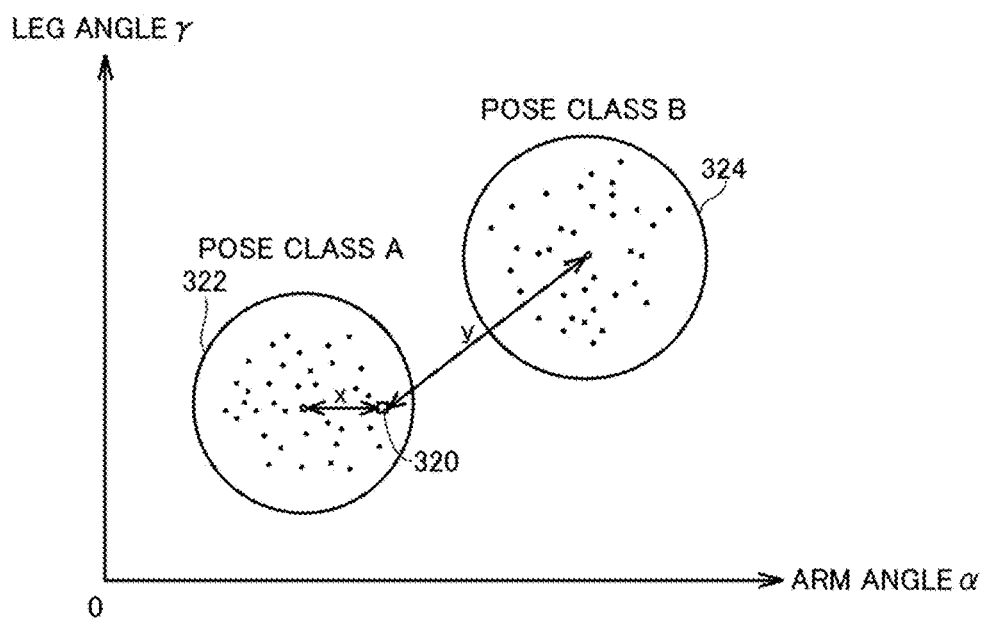
FIG. 14 is a diagram showing a distribution of the inter-part relation.
Figures 15, 16:
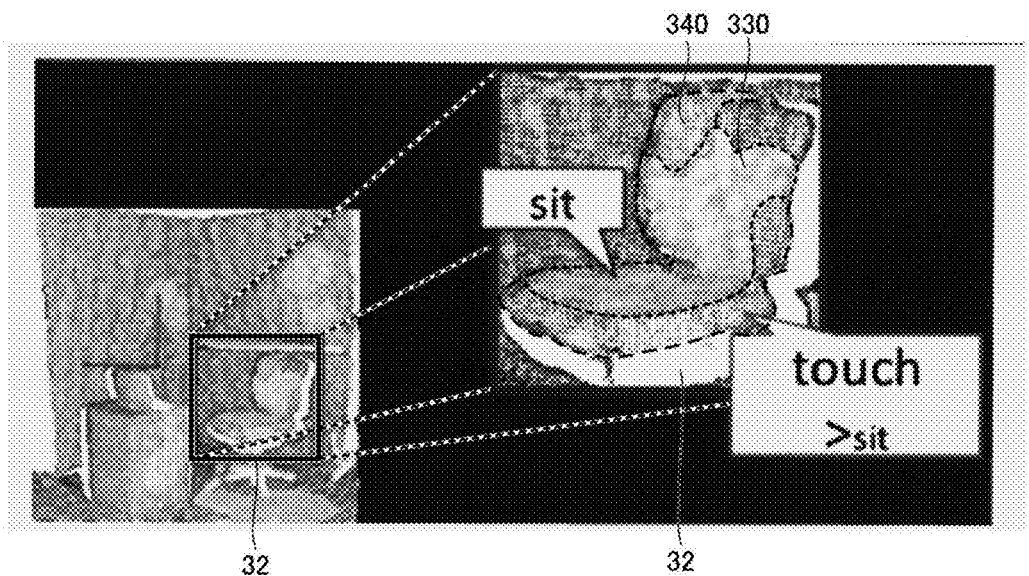
FIG. 15 is a diagram showing a data structure of the pose class.
FIG. 16 is a diagram showing an example of a manner of displaying an added label.

Referring to FIGS. 14 and 15, details of pose class identification unit 240 will be described. FIG. 14 is a diagram showing a distribution of inter-part relation. FIG. 15 is a diagram showing a data structure of the pose class.

Pose class identification unit 240 identifies a pose class to which a pose of the person when touching the object belongs. For example, pose class identification unit 240 identifies a pose class where the distance between the central point of the pose class and a point 320 represented by the inter-part relation when the person touches the object falls within a predetermined range.

For example, in the case where a distance x between point 320 and the central point of pose class A is equal to or less than the distance between the central point and a threshold range 322, it is determined that the person is pose class A and touching the object. In the case where a distance y between point 320 and the central point of pose class B is equal to or less than the distance between the central point and a threshold range 324, it is determined that the person is pose class B and touching the object. In the example shown FIG. 14, it is determined that the person is pose class A and touching the object.

Pose class identification unit 240 stores, in storage device 20, the identified pose class in association with the object. The stored pose class is defined by the threshold range for each index of the inter-part relation. The stored pose class may also be defined by the distance between the center coordinates of the pose class on the distribution shown in FIG. 14 and the distance from the center to the threshold range.

[Addition of Label]

Referring to FIG. 16, a method of adding a function label to the object will be described. FIG. 16 is a diagram showing an example of a manner of displaying an added label.

Image processing apparatus 100 adds, to the object, a label for each type of pose class, in order to show to the user the pose class identified for the object. Thus, the user can visually confirm the pose class identified for the object, and further confirm a difference in function of the object. Typically, in the case where pose classes associated with the object differ from each other, image processing apparatus 100 adds different labels, since the object has different functions. In the case where the same pose classes are associated with the object, image processing apparatus 100 adds the same label since the objects have the same function.

As a method of adding the label, a method may be used according to which a different color is added for each pose class. In FIG. 16, one pose class given to chair 32 is indicated by a blue label 340. Another pose class given to chair 32 is indicated by a red label 330. As to the region to which the label is added, the label may be added for each region where the person touches the object as shown in FIG. 16. Alternatively, one label may be added to the whole region identified as one object.

[Flowchart]

Figure 17:
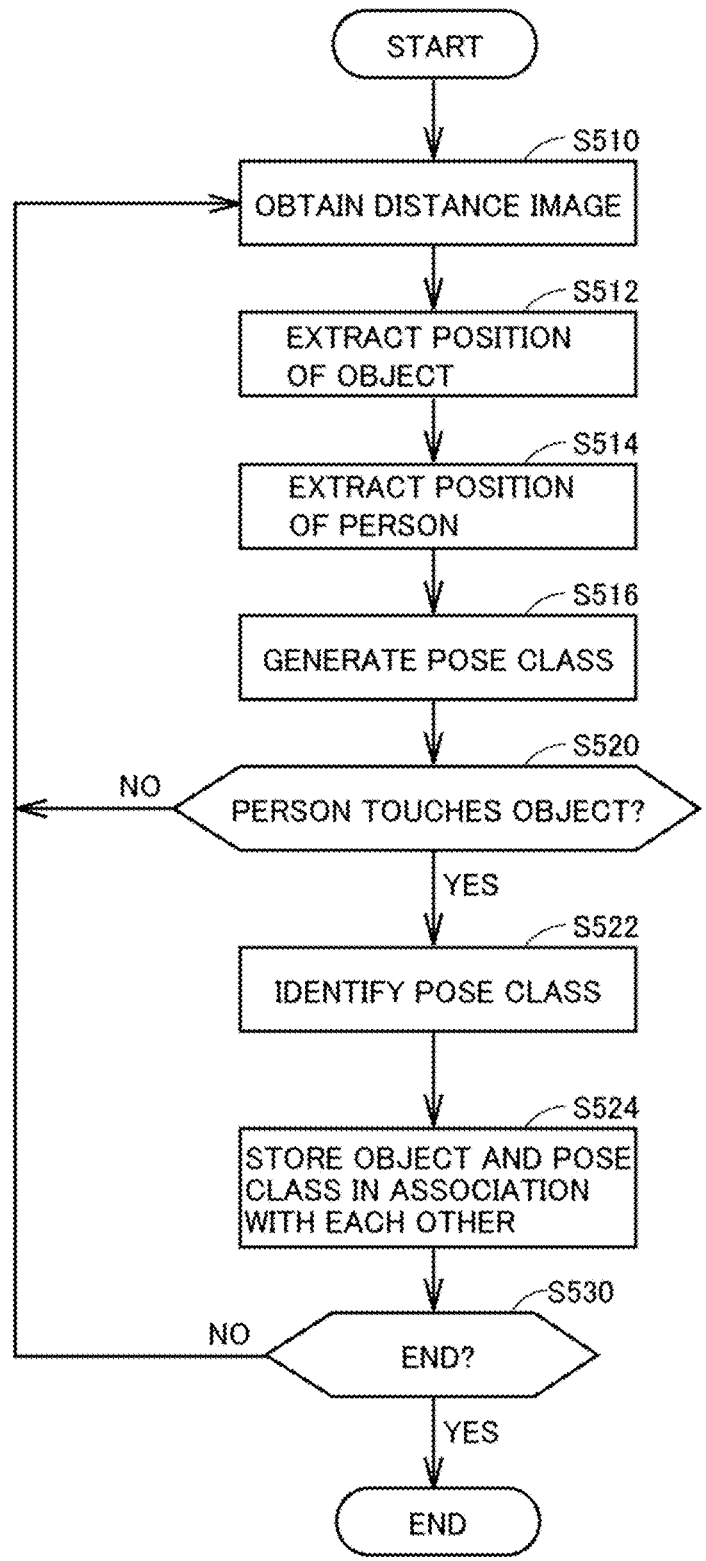
FIG. 17 is a flowchart showing a part of a process performed by the image processing apparatus in the first embodiment.

Referring to FIG. 17, a control structure of image processing apparatus 100 will be described. FIG. 17 is a flowchart showing a part of a process performed by image processing apparatus 100. The process in FIG. 17 is implemented through execution of a program by CPU 2. In another aspect, a part or the whole of the process may be performed by hardware such as circuit element or the like.

In step S510, CPU 2 obtains a distance image indicating the distance from a camera to each point on the surface of the subject. In step S512, CPU 2 functions as object extraction unit 210 to extract the position of the object from the distance image. The extracted position is for example represented by three-dimensional coordinate values. Since the position of the object rarely changes, the operation in step S512 may not be repeatedly performed.

In step S514, CPU 2 functions as person extraction unit 220 to extract the position of the person from the distance image. The extracted position is represented for example by three-dimensional coordinate values. In step S516, CPU 2 functions as pose clustering unit 230 to generate a pose class for each set of part information pieces which are similar to each other in terms of correlation between parts of the person (namely inter-part relation).

In step S520, CPU 2 functions as pose class identification unit 240 to determine whether or not the person touches the object. In the case where the distance between the person and the object becomes within a predetermined range or the distance between the person and the object becomes zero, CPU 2 determines that the person touches the object. In the case where CPU 2 determines that the person touches the object (YES in step S520), CPU 2 shifts the control to step S522. Otherwise (NO in step S520), CPU 2 returns the control to step S510.

In step S522, CPU 2 functions as pose class identification unit 240 to identify, among a plurality of generated pose classes, a pose class to which the pose of the person when touching the object (namely inter-part relation) belongs. In step S524, CPU 2 stores the object touching the person and the identified pose class in the state of being associated with each other.

In step S530, CPU 2 determines whether to end the image processing in the present embodiment. When a user performs an operation for ending the image processing for example, the image processing is ended. In the case where CPU 2 determines that image processing in the present embodiment should be ended (YES in step S530), CPU 2 ends the image processing. Otherwise (NO in step S530), CPU 2 performs the operations from step S510 to S524 again.

[Advantages]

In this way, image processing apparatus 100 in the present embodiment can automatically generate a pose class for each set of similar poses. Thus, it is possible to save the labor such as registering, in advance, the pose information classified by the user. In the case where the user defines poses, the definitions of the poses are determined from the user's subjective point of view and thus it is difficult to uniquely determine the pose. In contrast, image processing apparatus 100 can uniquely determine the pose without depending on the user. Accordingly, image processing apparatus 100 can correctly identify the pose of the person assumed with respect to the object.

<Second Embodiment>

[General Description]

In the following, an image processing apparatus 100A in a second embodiment will be described. Image processing apparatus 100A differs from image processing apparatus 100 in the first embodiment in that the former uses, in addition to the correlation between parts of the person, the positional relation between the person and the object to classify poses. The hardware configuration of image processing apparatus 100A is identical to the hardware configuration of image processing apparatus 100 in the first embodiment, and therefore, the description thereof will not be repeated.

Figure 18:
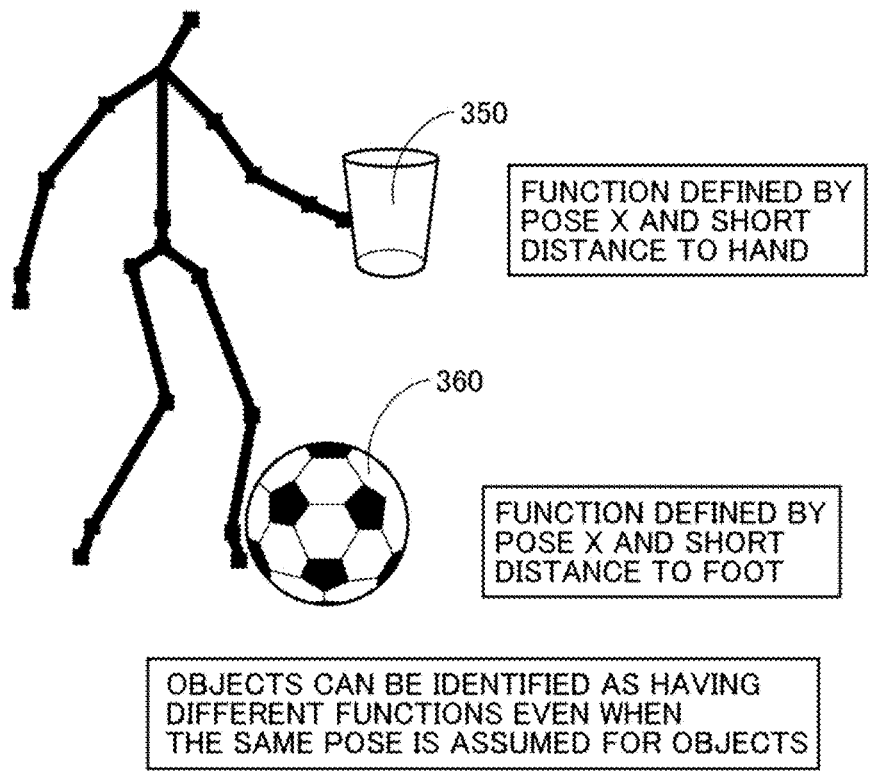
FIG. 18 is a diagram for illustrating a difference in function between objects due to a difference in position of the object.
Figure 19:
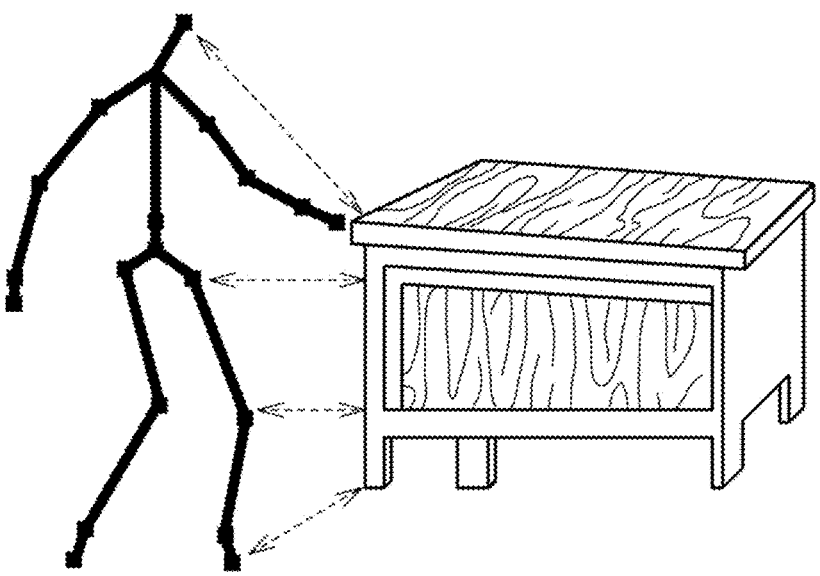
FIG. 19 is a diagram visually illustrating a distance between each part of a person and an object.

Referring to FIGS. 18 and 19, a general description will be given of image processing apparatus 100A in the second embodiment. FIG. 18 is a diagram for illustrating a difference in function between objects due to a difference in positional relation between a person and an object. FIG. 19 is a diagram visually illustrating the distance between each part of a person and an object.

In the case where a person uses objects having respective functions different from each other, the positional relation between the person and one object often differs from the positional relation between the person and the other object. For example, as shown in FIG. 18, a glass 350 is held in a hand when in use. Accordingly, there is a high possibility that the relative distance between the hand and glass 350 is shorter while the distance between any part other than the hand and glass 350 is longer. A football 360 is kicked with a foot when in use. Accordingly, there is a high possibility that the relative distance between the foot and football 360 is shorter while the distance between any part other than the foot and football 360 is longer.

As seen from the above, in the case where a person uses objects having respective functions different from each other, there is a high possibility that the correlation between each part of the person and one object differs from the correlation between each part of the person and the other object. Therefore, the positional relation between the person and the object when the person touches or is in close proximity with the object can be effective information for identifying the function of the object.

Thus, image processing apparatus 100A in the present embodiment identifies the correlation between each characteristic part of the person and the object (hereinafter also referred to as "person-object relation"). The person-object relation includes at least one of the distance between each joint of the person included in the field of view of camera 110 and the object, and the distance between each terminal part of the person and the object. For example, as the person-object relation, the relative distance between the object and each characteristic part of the person such as joint or terminal part like head or fingertip of the person is used, as shown in FIG. 19. The person-object relation may be the shortest distance from each part of the person to the surface of the object, or the relative distance from each part of the person to the position of the gravity center of the object. Besides, the person-object relation may be any information as long as the information represents a relative positional relation between the person and the object.

[Functional Configuration]

Figure 20:
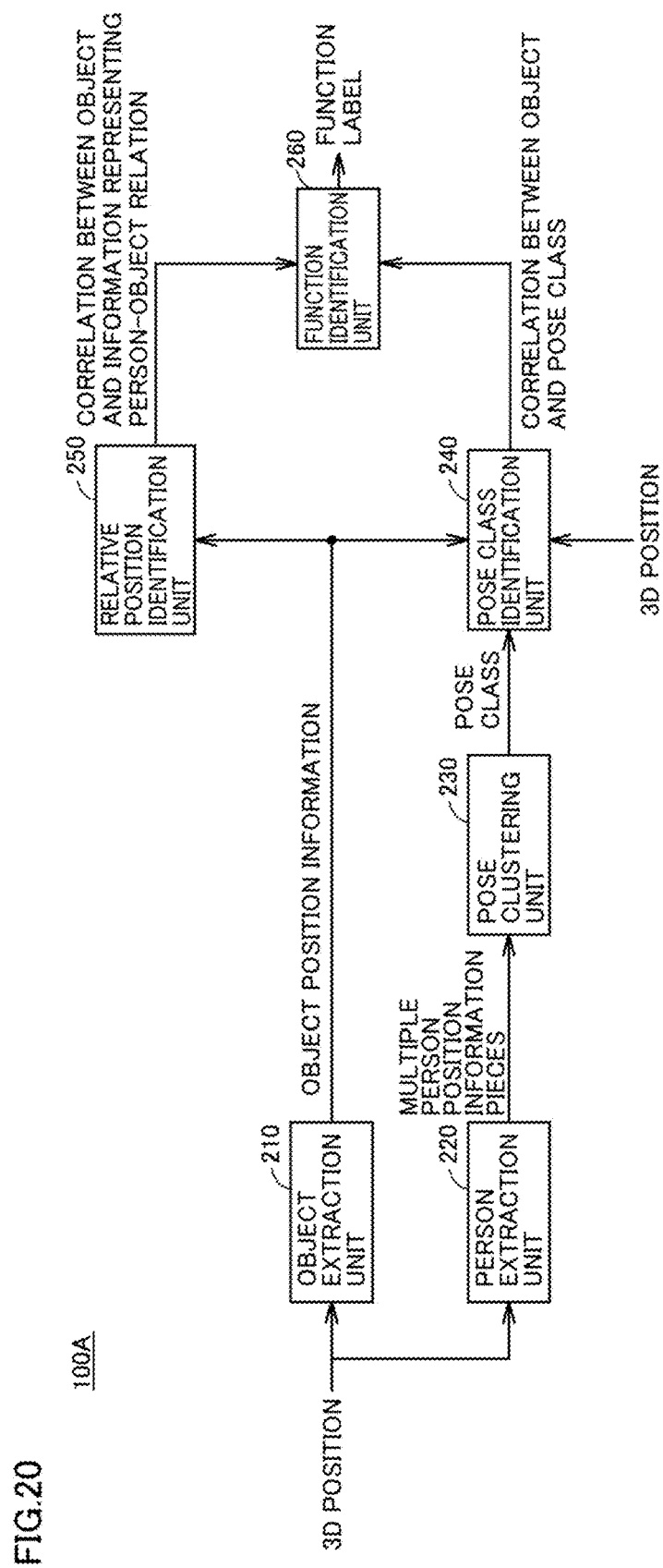
FIG. 20 is a block diagram showing an example of a functional configuration of an image processing apparatus in a second embodiment.
Figure 21:
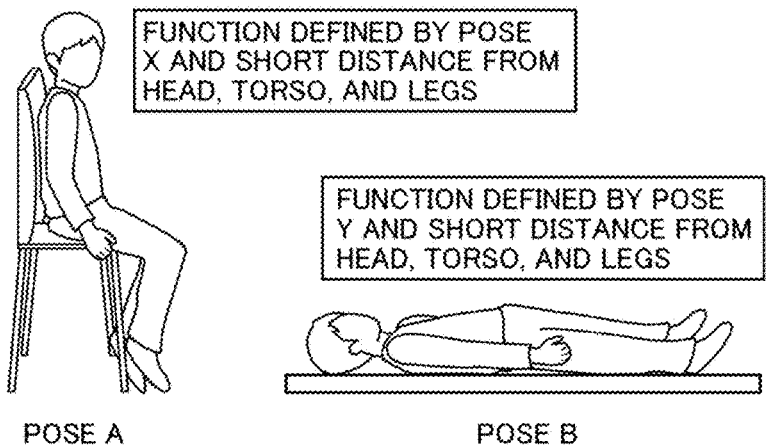
FIG. 21 is a diagram for illustrating a difference in function between objects due to a difference in pose.

Referring to FIGS. 20 and 21, a functional configuration of image processing apparatus 100A in the second embodiment will be described. FIG. 20 is a block diagram showing an example of a functional configuration of image processing apparatus 100A. FIG. 21 is a diagram for illustrating a difference in function between objects due to a difference in pose.

Image processing apparatus 100A includes an object extraction unit 210, a person extraction unit 220, a pose clustering unit 230, a pose class identification unit 240, a relative position identification unit 250, and a function identification unit 260. Since object extraction unit 210, person extraction unit 220, pose clustering unit 230, and pose class identification unit 240 are similar to the above-described ones, the description thereof will not be repeated.

Relative position identification unit 250 identifies a correlation between the object and each characteristic part of the person (namely person-object positional relation) when the distance between the person and the object included in the field of view of camera 110 is within a predetermined range. Namely, relative position identification unit 250 identifies the positional relation between the person and the object when a part of the person touches or is in close proximity with the object. Relative position identification unit 250 stores the object touching or in close proximity with the person and the identified person-object positional relation in the state of being associated with each other.

It should be noted that relative position identification unit 250 may store the relative distance between each part of the person and the object as it is, as the information representing the person-object positional relation. The relative distance between the person and the object may be stored as it is. However, in this case, there is a possibility that the positional relations between the object and the person are classified excessively finely.

In view of the above, relative position identification unit 250 classifies the relative distances into a plurality of distance classes determined in advance, and the relation between the distance class and the object may be stored as information representing the person-object positional relation. More specifically, in the case where the distance between the person and the object included in the field of view of camera 110 is within a predetermined range, relative position identification unit 250 identifies, among a plurality of distance classes classified according to the length of the relative distance, a distance class to which each relative distance between the object and each part of the person belongs. For example, relative position identification unit 250 may binarize the relative distance for each characteristic part into touching and non-touching, and store the relation between the binarized value and the object. Further, relative position identification unit 250 may use a predetermined threshold value to quantize the relative distance as "far," "close," or "touch" for example. Relative position identification unit 250 can quantize the relative distance to exclude the influence of a slight difference in positional relation between the person and the object.

In order to save the labor for registering the distance class in advance, relative position identification unit 250 may automatically cluster relative distances to generate a group for each set of similar relative distances. More specifically, relative position identification unit 250 generates a distance class for each set of similar relative distances between the object and the position of each part of the person repeatedly extracted by person extraction unit 220. In the case where the distance between the person and the object included in the field of view of camera 110 is within a predetermined range, relative position identification unit 250 identifies, among a plurality of distance classes, the distance class to which each relative distance between each part of the person and the object belongs. Relative position identification unit 250 can automatically cluster relative distances to exclude any influence of a slight difference in the positional relation between the person and the object.

Function identification unit 260 identifies the function of the object, based on the pose class obtained from pose clustering unit 230 and the information representing the person-object positional relation between the person and the object when they touch each other which is obtained by relative position identification unit 250. "Function" herein refers to a function which can be identified based on the pose class and the person-object positional relation, rather than the function of the common meaning such as "for sitting," "for eating" or the like. For example, in the case of expressing the function "for sitting," this function is expressed by the fact that the leg and the hip are bent 90 degrees (pose class) and the hip touches the object (person-object positional relation).

In the case where there are two different objects and the information representing the person-object positional relation associated with one object differs from the information representing the person-object positional relation associated with the other object, function identification unit 260 determines that these two objects have respective functions different from each other. In the case where these information pieces are identical to each other, function identification unit 260 determines that the objects have respective functions identical to each other.

More specifically, as shown in FIG. 18, in the case where the pose class identified for glass 350 is X and a second positional relation is Y, function identification unit 260 determines that glass 350 has "a function defined by pose class X and distance class Y." In the case where the pose class identified for football 360 is X and the second positional relation is Z, function identification unit 260 determines that football 360 has "a function defined by pose class X and distance class Z." Namely, function identification unit 260 determines, based on the fact that the distance class for glass 350 differs from the distance class for football 360, the function of glass 350 differs from the function of football 360.

Thus, in the case for example where the person assumes the same pose when touching different objects while the person's part like foot or hand in close proximity with one of the objects differs from the person's part in close proximity with the other object, it is determined that these objects have respective functions different from each other. Accordingly, image processing apparatus 100A can more appropriately determine the function of the object. Namely, image processing apparatus 100A can eliminate erroneous determination about the function of the object.

In the case where respective pose classes associated with two different objects differ from each other, function identification unit 260 determines that these two objects have respective functions different from each other. In the case where these pose classes are identical to each other, function identification unit 260 determines that these two objects have respective functions identical to each other. For example, as shown in FIG. 21, sitting on a chair 32 with a backrest is the same as lying on a sleeping mattress 33 in that the body from the head to the feet entirely touches the object. However, the pose with respect to the chair differs from the pose with respect to the sleeping mattress. Thus, according to the difference in pose class with respect to the object, functions of objects can be classified.

More specifically, in the case where the pose class identified for chair 32 is X and the second positional relation is Y, function identification unit 260 determines that chair 32 has "a function defined by pose class X and distance class Y." In the case where the pose class identified for sleeping mattress 33 is Z and the second positional relation is Y, function identification unit 260 determines that sleeping mattress 33 has "a function defined by pose class is Z and distance class Y." Namely, function identification unit 260 determines, based on the fact that the pose classes for these objects are different from each other, the function of chair 32 differs from the function of sleeping mattress 33.

Accordingly, in the case for example where the positional relation between each part of the person and an object is the same as the positional relation between each part of the person and another object and the pose of the person touching the one object differs from the pose of the person touching the other object, it is determined that the objects have respective functions different from each other. Thus, image processing apparatus 100A uses both the pose class and the person-object relation to determine the function of the object. Therefore, as compared with the case where the function of the object is determined based on only the person-object relation, erroneous determination about the function of the object can be eliminated.

[Advantages]

In this way, image processing apparatus 100A in the present embodiment uses both the pose class and the person-object relation to identify the function of the object. Accordingly, as compared with the case where the function of the object is determined based on only the pose class, the function of the object can more accurately be identified.

<Third Embodiment>

In the following, an image processing apparatus 100B in a third embodiment will be described. Image processing apparatus 100B in the present embodiment differs from image processing apparatus 100 in the first embodiment in that the former has a result display function for a user to confirm the pose class identified for each object. In the other respects, image processing apparatus 100B is identical to image processing apparatus 100 in the first embodiment, and therefore the description thereof will not be repeated.

Figure 22:
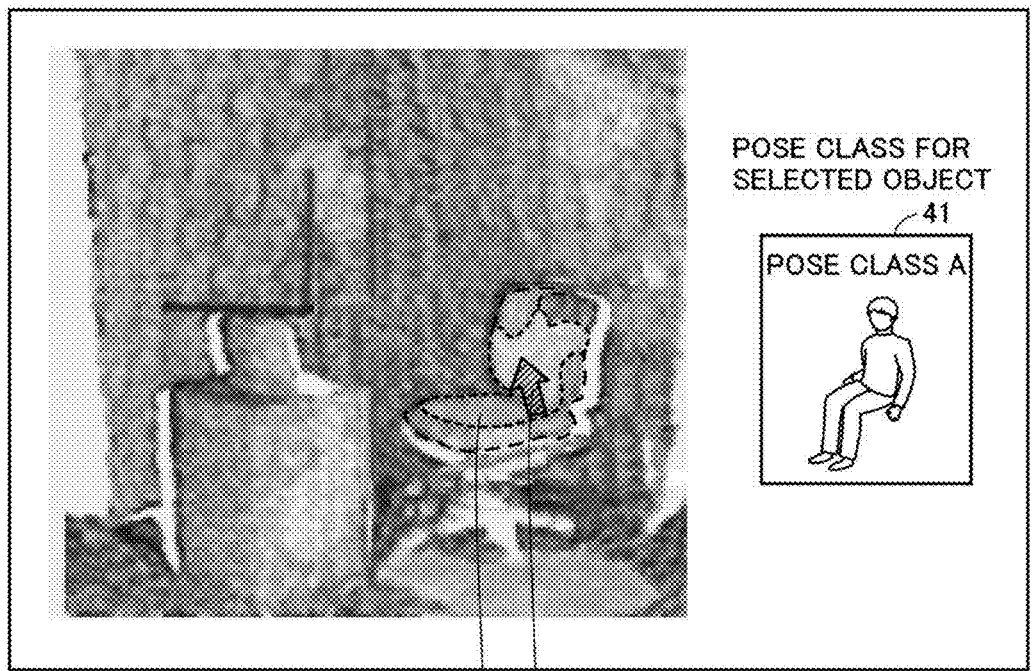
FIG. 22 is a diagram showing an example of a manner of displaying a screen for confirming a pose class identified for each object.

Referring to FIG. 22, image processing apparatus 100B in the third embodiment will generally be described. FIG. 22 is a diagram showing an example of a manner of displaying a screen for confirming the pose class identified for each object.

To image processing apparatus 100B, a display device 7 is connected. Display device 7 may be incorporated in image processing apparatus 100B. On display device 7, a user interface screen for adding a function tag is shown. Image processing apparatus 100B displays the screen so that a user selecting an object displayed on the screen can visually recognize the pose class associated with the object. For example, in the case where the user operates a cursor 35 to select chair 32, image processing apparatus 100B refers to the correlation between the object and the pose class stored in storage device 20 to select the pose class associated with the chair. In the case where the user selects another object, image processing apparatus 100B selects the pose class associated with the selected object.

In the case for example where chair 32 is associated with pose class A, image processing apparatus 100B generates a pose image based on this pose class A. As shown in FIG. 15, the pose class includes the correlation between parts of the person (namely the inter-part relation) as data, image processing apparatus 100B identifies the position of each part of the person based on the inter-part relations, and generates a pose image based on respective identified positions of the parts. The generated pose image is shown on display device 7.

The above description relates to the example where the pose class associated with the object is displayed. However, image processing apparatus 100B may have a result display function for confirming the person-object relation associated with the object. In this case, the user selects an object shown on display device 7, and display device 7 in response displays the relation between the selected object and the pose of the person assumed for the object.

[Advantages]

In this way, image processing apparatus 100B in the present embodiment enables the person's pose assumed for the object to be confirmed at a glance. Display of the pose image therefore helps determination of the object design or the object shape easy to use by humans.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 ROM; 2 CPU; 3 RAM; 4 camera I/F; 5 memory card I/F; 5A memory card; 6 network I/F; 7 display device; 20 storage device; 21 part information; 22 object position information; 23 inter-part relation; 24 image processing program; 30 distance image; 31 person; 32, 101, 105, 106 chair; 33 sleeping mattress; 35 cursor; 41, 42, 43, 44 pose class; 100, 100A, 100B image processing apparatus; 110 camera; 210 object extraction unit; 211 region; 220 person extraction unit; 230 pose clustering unit; 240 pose class identification unit; 250 relative position identification unit; 260 function identification unit; 301 left shoulder position; 302 left hip position; 303 left knee position; 304 left foot position; 310 pose information; 320 point; 322, 324 threshold range; 330 red label; 340 blue label; 350 glass; 360 football

The invention claimed is:

1. An image processing apparatus providing information for identifying a function of an object, the function being identified based on a pose of a person with respect to the object, the person and the object being a photography subject, the image processing apparatus comprising:

an object extraction unit configured to continuously shoot the photography subject to obtain a plurality of images, detect the object from a three-dimensional position of the photography subject in the images, and extract a position of the object;

a person extraction unit configured to detect the person and extract a position of the person from the three-dimensional position, and extract, from the position of the person, a plurality of part information pieces including respective positions of characteristic parts of the person;

a pose clustering unit configured to generate a pose class for each set of part information pieces, the part information pieces being similar to one another in correlation between parts of the person calculated from each of the plurality of part information pieces;

a pose cluster identification unit configured to identify a pose class to which the correlation between parts of the person belongs, among a plurality of pose classes generated by the pose clustering unit, in a case where a distance between the person and the object included in the images is within a predetermined range;

a storage unit configured to store the pose class identified by the pose cluster identification unit, in association with the object, and a relative position identification unit configured to identify a correlation between the object and each characteristic part of the person, in a case where the distance between the person and the object included in the images is within the predetermined range, wherein the storage unit is configured to store information representing the correlation identified by the relative position identification unit, in association with the object.

2. The image processing apparatus according to claim 1, wherein the part information pieces each include at least one of a position of each joint of the person included in the images and a position of each terminal part of the person.

3. The image processing apparatus according to claim 1, wherein the pose clustering unit is configured to generate the pose class based on that the distance between the person and the object included in the images is within a predetermined range.

4. The image processing apparatus according to claim 1, wherein the correlation between the object and each characteristic part of the person includes at least one of distances each between the object and each joint of the person included in the images, and distances each between the object and each terminal part of the person.

5. The image processing apparatus according to claim 1, wherein the relative position identification unit is configured to identify a distance class to which each relative distance between the object and each part of the person belongs, among a plurality of distance classes classified in advance according to a length of distance, in a case where the distance between the person and the object included in the images is within a predetermined range, and each identified distance class is the information stored in the storage unit.

6. The image processing apparatus according to claim 1, wherein the relative position identification unit is configured to generate a distance class for each set of similar relative distances, the relative distances are each a relative distance between the object and a position of each part of the person repeatedly extracted by the person extraction unit, and the relative position identification unit is configured to identify a distance class to which each relative distance between the object and each part of the person belongs, among a plurality of the generated distance classes, in a case where the distance between the person and the object included in the images is within a predetermined range, and each identified distance class is the information stored in the storage unit.

7. The image processing apparatus according to claim 1, further comprising a function identification unit configured to identify two different objects as having respective functions different from each other, in a case where the pose class associated with one of the two different objects is different from the pose class associated with the other of the two different objects.

8. The image processing apparatus according to claim 1, further comprising a function identification unit configured to identify two different objects as having respective functions different from each other, in a case where the information associated with one of the two different objects is different from the information associated with the other of the two different objects.

9. An image processing method providing information for identifying a function of an object, the function being identified based on a pose of a person with respect to the object, the person and the object being a photography subject, the image processing method comprising:

continuously shooting the photography subject to obtain a plurality of images, and detecting the object and extracting a position of the object from a three-dimensional position of the photography subject in the images;

detecting the person and extracting a position of the person from the three-dimensional position, and extracting, from the position of the person, a plurality of part information pieces including respective positions of characteristic parts of the person;

generating a pose class for each set of part information pieces, the part information pieces being similar to one another in correlation between parts of the person calculated from each of the plurality of part information pieces;

identifying a pose class to which the correlation between parts of the person belongs, among a plurality of generated pose classes, in a case where a distance between the person and the object included in the images is within a predetermined range;

storing the identified pose class in association with the object, and identifying a correlation between the object and each characteristic part of the person, in a case where the distance between the person and the object included in the images is within the predetermined range, wherein the storing step stores information representing the correlation identified by the relative position identification unit, in association with the object.

10. A non-transitory recording medium encoded with an image processing program providing information for identifying a function of an object, the function being identified based on a pose of a person with respect to the object, the person and the object being a photography subject, the image processing program causing a computer to perform:

continuously shooting the photography subject to obtain a plurality of images, and detecting the object and extracting a position of the object from a three-dimensional position of the photography subject in the images;

detecting the person and extracting a position of the person from the three-dimensional position, and extracting, from the position of the person, a plurality of part information pieces including respective positions of characteristic parts of the person;

generating a pose class for each set of part information pieces, the part information pieces being similar to one another in correlation between parts of the person calculated from each of the plurality of part information pieces;

identifying a pose class to which the correlation between parts of the person belongs, among a plurality of generated pose classes, in a case where a distance between the person and the object included in the images is within a predetermined range;

storing the identified pose class in association with the object, and identifying a correlation between the object and each characteristic part of the person, in a case where the distance between the person and the object included in the images is within the predetermined range, wherein the storing step stores information representing the correlation identified by the relative position identification unit, in association with the object.

* * * * *